United States Patent [19]

Hasson

[11] Patent Number: 5,677,761
[45] Date of Patent: Oct. 14, 1997

[54] PASSIVE RANGING TO SOURCE OF KNOWN SPECTRAL EMISSION

[75] Inventor: Victor H. Hasson, Winchester, Mass.

[73] Assignee: Textron Systems Corporation, Wilimington, Mass.

[21] Appl. No.: 506,847

[22] Filed: Jul. 25, 1995

[51] Int. Cl.⁶ .................. G01C 3/08; G01J 5/02
[52] U.S. Cl. .................. 356/4.07; 250/339.15; 250/342; 342/351
[58] Field of Search .................. 250/339.15, 342, 250/349; 356/4.07, 139.04; 342/351

[56] References Cited

U.S. PATENT DOCUMENTS 4,355,894  10/1982  Maeda ........................... 356/5
4,694,172   9/1987  Powell et al. ................. 250/339
5,282,013   1/1994  Gregoris ........................ 356/4

*Primary Examiner*—Mark Hellner
*Attorney, Agent, or Firm*—Perman & Green, LLP

[57] ABSTRACT

A system and method of passive ranging for a luminous target employs a prior knowledge and a present measurement of its electromagnetic spectrum during a target acquisition procedure and, subsequently, during analysis of the spectrum to determine the effects of atmospheric attenuation on various parts of the spectrum. Relative attenuation of various spectral components by the atmosphere is indicative of target range.

8 Claims, 5 Drawing Sheets

PASSIVE RANGING TO SOURCE OF KNOWN SPECTRAL EMISSION

BACKGROUND OF THE INVENTION

This invention relates to a measurement of the range of a source of electromagnetic radiation and, more particularly, to the use of passive ranging by examination of relative attenuation among a plurality of spectral lines wherein differences in attenuation among various portions of the radiation spectrum arise from selective atmospheric absorption of radiation at various frequencies as a function of propagation distance of the radiation through the atmosphere. The foregoing attenuation is in addition to the attenuation arising from the spreading of the waves of radiation through increasing regions of space, the latter attenuation following the well-known relationship of intensity varying as the inverse square of the range from a point source of the radiation.

Various objects, such as the plume of a rocket or other fire, or a hot filament or gas discharge of a lamp, are known to act as sources of radiation having characteristic spectra. There are situations in which it is desirable to determine the location of such a source from a viewing site distant from the source, the location data including range, elevation and azimuth of the target source from the viewing site. However, a problem arises in that the usual apparatuses for determination of target location, such as active radar, are not operative with the foregoing type of radiant energy signal for a passive determination of the range of the source.

SUMMARY OF THE INVENTION

The aforementioned problem is overcome and other advantages are provided by a system and method of passive ranging, in accordance with the invention, wherein a suitable target, or distant source of radiation, is identified by its electromagnetic spectrum during a target acquisition procedure and, thereafter, the spectrum of the radiation is analyzed to determine the effects of atmospheric attenuation on various parts of the spectrum. In the practice of the invention, prior knowledge of the spectrum, as emitted by the target, is employed in both the acquisition and the analysis stages. The invention is particularly useful in the situation wherein a source of radiation, on or near the ground, illuminates a cloud above the source, and a distant observer obtains range of the source by observation of radiation scattered from the cloud.

A typical spectrum includes both a continue distribution of spectral energies in an emission band or in each of a plurality of emission bands, as well as a line spectrum wherein individual ones of the lines are characteristic of certain constituent substances in a source of the radiation, such as the various gasses in a rocket plume. In accordance with the theory of the invention, a source of radiation, such as a rocket plume, emits radiation characterized by a known set of spectral emission lines and/or emission bands. The lines of the line spectrum, as well as an amplitude profile of the continuous spectrum, are useful in identifying the source of the radiation. Generally, the spectrum of a received radiation signal will be shifted in frequency by a Doppler shift due to motion of the source, and there will be a broadening of one or more of the spectral lines due to movement of the gasses and particles thereof within the rocket plume. To identify the spectrum of a received radiation signal automatically, as by use of a computer or other signal processor, the received spectrum may be correlated against known spectra from a set of previously stored spectra. The previously stored spectra correspond to respective ones of known rocket plumes and other sources of radiation which may be of interest. A match is obtained between the received spectrum and one of the known spectra, the match serving to identify the source of the radiation. The correlation also indicates a frequency offset between the two matching spectra and, hence, is useful in providing the additional information of Doppler shift.

In accordance with a feature of the invention, a continuous portion of the received spectrum can be employed to determine range of a target, such as the plume of a rocket, independently of whether or not there be any Doppler frequency shift. Operation of the invention to obtain the range may be explained as follows. As the radiation propagates through the atmosphere from the source to optical receiving apparatus employed by the invention, there may be interaction between the radiation and various substances dependent on the frequency of the radiation. The interaction results in a relative attenuation of various spectral components by the atmosphere as a function of frequency and a function of distance of propagation of the radiation through the atmosphere. Thus, the attenuation is indicative of target range.

Measurement of the ratios of intensities of radiations at the various spectral bands at a distance from the source will differ from the same measurements performed at the location of the source because of the selective absorption of the radiation at its various spectral bands. In the practice of the invention, a correlation is made between variation of an intensity ratio of any two spectral lines as a function of distance between source and the receiving apparatus. The range to the source is thereby obtainable from spectrometric measurements of the radiation, computation of the intensity ratio, and association of the specific range with a specific intensity ratio, or an average value of ranges obtained from sets of intensity ratios. A succession of range measurements may be differentiated to obtain range rate.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures.

DETAILED DESCRIPTION

Figure 1:
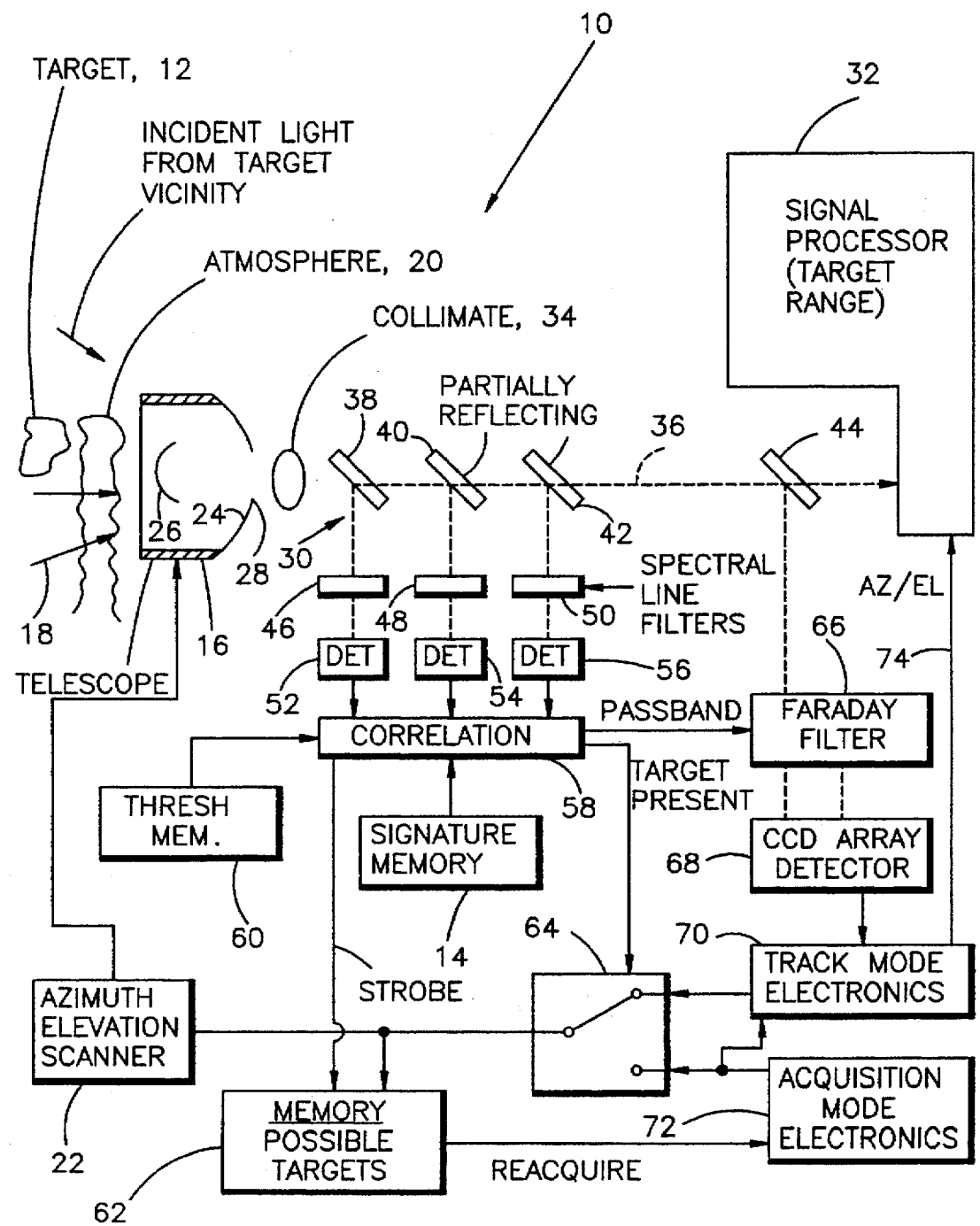
FIG. 1 is a block diagram of an electrooptic system useful in the practice of the invention.

FIG. 1 shows an electrooptic system 10 for obtaining passively spectral data of electromagnetic radiation emitted by a distant target 12. In accordance with the invention, the electromagnetic radiation emitted by the target 12 has a known spectrum, or target signature, which is stored in a signature memory 14. The system 10 includes a telescope 16 which views electromagnetic radiation, indicated as a plurality of light rays 18, which propagates through the atmosphere 20 to be incident upon the telescope 16. The telescope 16 is steered mechanically in azimuth and in elevation by a scanner 22 which enables the telescope 16 to scan through space to determine whether the target 12 as well as other targets may be present. By way of example, the telescope 16 is shown in a Cassegrain form having a main mirror 24 and a secondary mirror 26, the latter reflecting light through an aperture 28 to an optical assembly 30.

The optical assembly 30 provides an optical path from the telescope 16 to a signal processor 32 of the system 10. The signal processor 32, operates in a manner to be described with reference to FIG. 2, for extracting spectral data from the target radiation, and for determining the range of the target 12 to the telescope 16 from the spectral data. The optical assembly 30 comprises a collimating lens 34 for establishing a beam 36 of parallel rays suitable for operation of the signal processor 32. In addition, the optical assembly 30 comprises four partially reflecting mirrors 38, 40, 42, and 44 for tapping off portions of the optical energy of the beam 36 to be used for purposes of acquiring and tracking the target 12.

The system 10 further comprises three spectral line filters 46, 48, and 50, three detectors 52, 54, and 56 of target radiation received by the telescope 16, and a correlation unit 58. In operation, a portion of the optical energy of the beam 36 is reflected by the mirror 38 via the filter 46 to the detector 52, the detector 52 converting the optical energy to an electrical signal which is applied to the correlation unit 58. In similar fashion, optical energy reflected by the mirror 40 propagates via the filter 48 to the detector 54 to be converted to an electrical signal which is applied to the correlation unit 58. Also, optical energy reflected by the mirror 42 propagates through the filter 50 to be converted by the detector 56 to an electrical signal which is applied to the correlation unit 58.

The filters 46, 48, and 50 provide different specific passbands for the propagation of the optical energy of the beam 36. This enables each of the filters 46, 48, and 50, in conjunction with the respective detectors 52, 54 and 56, to view only a specific portion of the spectrum of the target radiation while discarding the balance of the radiation. Thereby, the detectors 52, 54, and 56 signal the presence of specific spectral lines. The absence of a signal outputted by any one of the detectors 52, 54, and 56 is an indication of the absence of the corresponding spectral line from the spectrum of the target radiation. It is to be noted that the use of three signal channels provided by the three mirrors 38, 40, and 42 in combination with the three filters 46, 48, and 50, and the three detectors 52, 54, and 56 is presented by way of example and that, in practice,. more of these signal channels may be employed for observation of additional spectral lines of the target spectrum. The correlation unit 58 obtains best fit between incoming spectral data, which may be Doppler shifted in the event of target motion, and the known spectrum of the target radiation stored in the signature memory 14. Thresholds, stored in a memory 60, are employed by the correlation unit 58 in a decision process of the correlation unit 58 for deciding if a specific spectral line is considered to be present.

The system 10 includes a memory 62 for storing the locations of possible targets in terms of azimuth and elevation address, a switch 64 operated by the correlation unit 54, a Faraday filter 66, a detector assembly 68 comprising an array of charge-coupled devices (CCD) providing a two-dimensional viewing of target image data on the beam 36, a track-mode electronics unit 70, and an acquisition-mode electronics unit 72. In operation, optical energy extracted from the beam 36 by the mirror 44 is directed by the mirror 44 via the Faraday filter 66 to the detector assembly 68. The use of the Faraday filter 66 is well known, such use being described in an article entitled HELICOPTER PLUME DETECTION BY USING AN ULTRANARROW-BAND NONCOHERENT LASER DOPPLER VELOCIMETER by S. H. Bloom et al, appearing in OPTICS LETTERS, Vol. 18, No. 3, Feb. 1, 1993 at pages 244–246.

The optical passband of the Faraday filter 66 is dependent on the strength of the magnetic field of the filter, and a specific spectral region of the incoming radiation may be selected for viewing via the filter 66 by adjustment of the magnetic field strength. The magnetic field strength is set by a passband signal outputted by the correlation unit 58 corresponding to the detection of a desired spectral line by one or more of the detectors 52, 54, and 56. The rays of light passing through the filter 66 retain their relative directions of orientation so that the detector assembly 68 is able to determine whether the source of the target radiation appears to be above or below the boresight axis of the telescope 16, or to the right or the left of the boresight axis. Thereby, the detector assembly 68 provides an error signal to the track-mode electronics unit 70 which indicates whether the telescope 16 is to be repositioned or oriented by the scanner 22 during a tracking of the target 12.

The acquisition-mode electronics unit 72 is operative to provide electric signals to the scanner 22 for directing the telescope 16 to view a designated portion of space during a scanning of space in the acquisition mode. The decision as to whether to enter the acquisition mode or the tracking mode is made by the correlation unit 58. Initially, the switch 64 is in the acquisition position for coupling signals from the acquisition-mode electronics unit 72 to the scanner 22. During the acquisition process, any possible targets noted by the correlation unit 58 are entered into the memory 62. This is accomplished by an output signal of the correlation unit 58 which strobes the memory 62 to store the azimuth and elevation command signals outputted by the acquisition-mode electronics unit 72 to the scanner 22. The storage of the possible target locations in the memory 62 is useful for entering a reacquisition mode wherein the electronics unit 72 scans a region of space around a possible target to ascertain the target coordinates in azimuth and in elevation.

Additionally, the acquisition-mode electronics unit 72 outputs the target coordinates to the track-mode electronics unit 70 during a hand-off procedure wherein the switch 64 is operated to disconnect the acquisition-mode electronics unit 72 from the scanner 22 and to connect the track-mode electronics unit 70 to the scanner 22. This operation of the switch 64 occurs upon the determination by the correlation unit 58 that a target is present. The azimuth and elevation (AZ/EL) coordinates of the target being tracked are applied by the track-mode electronics unit 70 to the signal processor 32, via line 74, for use in identifying a specific target by its angular coordinates.

Figure 2:
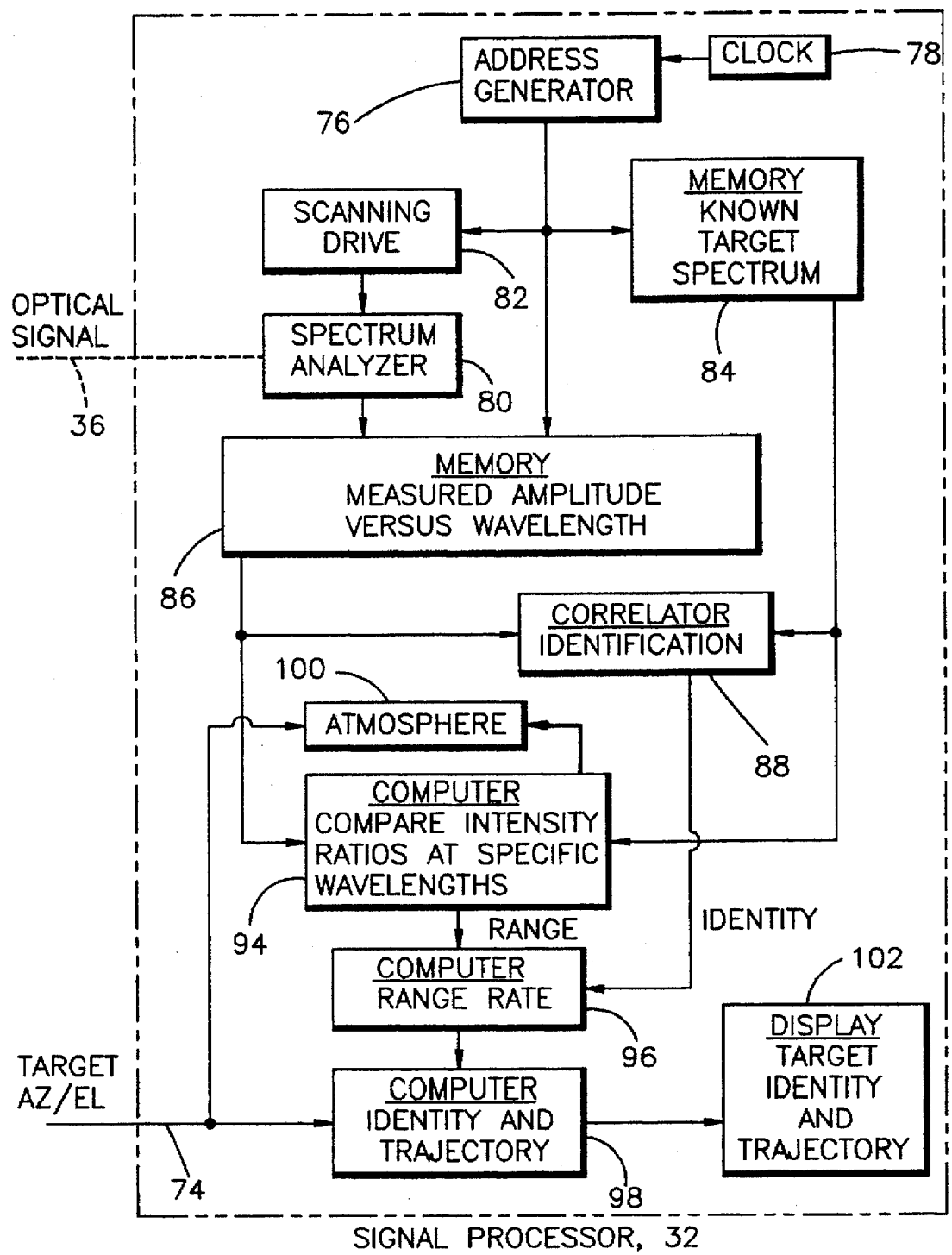
FIG. 2 is a block diagram of a signal processor forming a part of the system of FIG. 1.

As shown in FIG. 2, the signal processor 32 comprises an address generator 76 driven by a clock 78, and spectrum analyzer 80 which receives the beam 36 (FIG. 1) and is driven by a scanning drive 82. The signal processor 32 further comprises two memories 84 and 86 which are addressed by the address generator 76. The memory 84 stores known target spectral data for the target 12 (FIG. 1) as well as for other targets which may be viewed by the telescope 16 (FIG. 1). The memory 86 stores spectral data of the target 12 obtained by operation of the spectrum analyzer 80. The address provided by the generator 76 is in terms of the frequency coordinate in a graph of amplitude versus frequency for the target spectral data. The generator 76 is operative also to address the scanning drive 82 for directing the drive 82 to drive the spectrum analyzer 80 to a specific frequency during a scanning of the spectrum. Operation of the drive 82 may be either mechanical or electrical depending on the construction of the spectrum analyzer 80.

By way of explanation of the operation of the invention for the measurement of range to a source of radiation, it is noted that in a hypothetical case, in the absence of selective atmospheric attenuation of various portions of the target spectrum, such as for the propagation of radiation in vacuum, it is apparent that the relative amplitudes of various frequency components in the reference spectrum of the memory 84 would be the same as those being measured by the spectrum analyzer 80. However, due to the presence of the atmosphere 20 (FIG. 1), the selective attenuation results in a distortion of the measured spectrum such that the relative intensities of the spectral lines differ between the measured and the reference spectra. The nature of the distortion depends on the propagation distance of the radiation through the atmosphere. The invention employs a relatively small continuous portion of the electromagnetic spectrum wherein the influence of clouds, rainfall, aerosols, or dust can be discounted because they present a substantially uniform attenuation, as a function of frequency, across the small portion of the spectrum employed for the range measurement.

With a knowledge of the atmospheric attenuation rates as a function of distance at various frequencies of the spectrum, the signal processor 32 can derive the target range by analysis of distortion in the received spectrum as compared to the reference spectrum. Assuming that the continuous portion of the target spectrum, utilized in the measurement, is essentially constant in amplitude at zero range, before attenuation by the atmosphere, a measurement of spectral distortion from attenuation can be accomplished without regard to Doppler frequency shift. The use of the continuous spectrum avoids any effect of a broadening of spectral lines by collisions among particles in the constituent substances of a rocket plume.

In the event that the nature of the target 12 is unknown, or in the event that any one of a plurality of targets (not shown) may be present, it is useful to provide means for identification of the target 12. In order to identify the target 12, the signal processor 32 further comprises a correlator 88 which correlates measured spectral data stored in the memory 86 with the known spectral data stored in the memory 84 to determine if a match can be made. Identification of the type of target is made by use of the target spectrum as a signature. A match between the spectra identifies the nature of the source of radiation, such as the plume of a rocket, and thereby serves to identify the target 12. For example, the spectrum may indicate a combustion of a certain type of fuel which serves to identify the target.

Also included in the signal processor 32 is computational equipment for calculation of target range, as well as for utilization of the target range to calculate range rate and trajectory. The computational equipment, for convenience in explaining operation of the processor 32, is portrayed as three separate computers 94, 96, and 98. The computer 94 receives input signals from the memories 86 and 84, and also receives atmospheric data stored at 100 in order to compare various ratios of intensities of selected spectral components of the measured target spectrum with corresponding ratios of intensities of the target reference spectrum. This will be described hereinafter in greater detail.

The range of the target produced by the computer 94, and the identity of the target produced by the correlator 88 are applied to the computer 96. Range rate can then be computed by the computer 96 by observing changes in range over an interval of time. Target range, range rate, and identity are then outputted by the computer 96 to the computer 98. The computer 98 receives the target azimuth and elevation coordinates via line 74 and, in conjunction with the range and the range rate, computes target trajectory. The azimuth and elevation coordinates also serve to identify the target by location. The target identity and trajectory data are outputted by the computer 98 to a display 102 for outputting data relative to each of the targets selected by the correlation unit 58 (FIG. 1) for analysis. The display 102 may include recording apparatus (not shown) for recording the data.

By way of example, in the use of the spectrum analyzer, 80, emission lines of sodium and potassium are discerned readily in the hot plumes of rockets by atomic line filters, such as the filters 46, 48, and 50 (FIG. 1) and by the spectrum analyzer 80. Such spectral lines facilitate identification of the target. The use of a spectrum analyzer, such as the analyzer 80, is disclosed in the aforementioned article of S. H. Bloom et al. The sodium and the potassium spectral lines are presented by way of example, and numerous other lines may be observed, depending on chemistries of the sources of radiation. In atomic spectroscopy, there are well-known doublet lines appearing in the spectrum which also serve to identify a source of the radiation. It is also recognized that the effect of atmospheric attenuation may vary with elevation angle and, accordingly, in FIG. 2, the target coordinates on line 74 are applied also for addressing the atmospheric data store 100 to select an atmospheric attenuation profile consonant with a specific value of target elevation.

Figure 3:
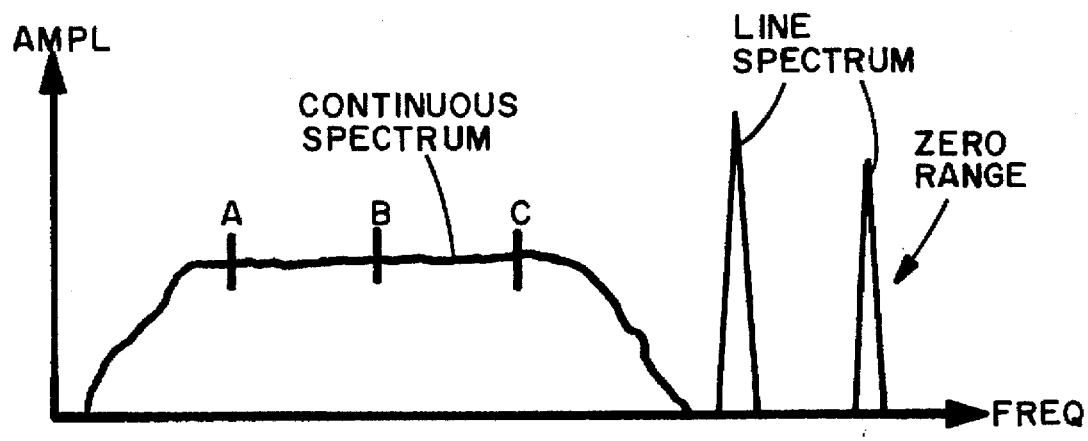
FIG. 3 is a stylized representation of the frequency spectrum of electromagnetic radiation, having both continuous and line spectral portions, emitted by a target at zero range with three significant frequency components of the continuous spectral portion being identified by the letters A, B, and C.
Figure 4:
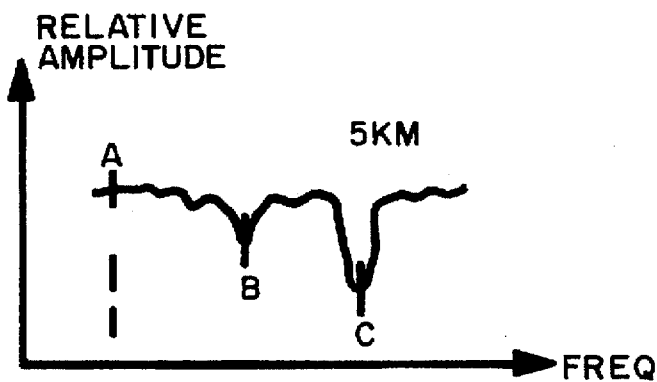
FIG. 4 is a stylized graph representing the relative amplitudes of the frequency components A, B, and C of FIG. 3 after the radiation has propagated through a distance in clear air, the amplitudes of the spectral components having been attenuated by the environment.
Figure 5:
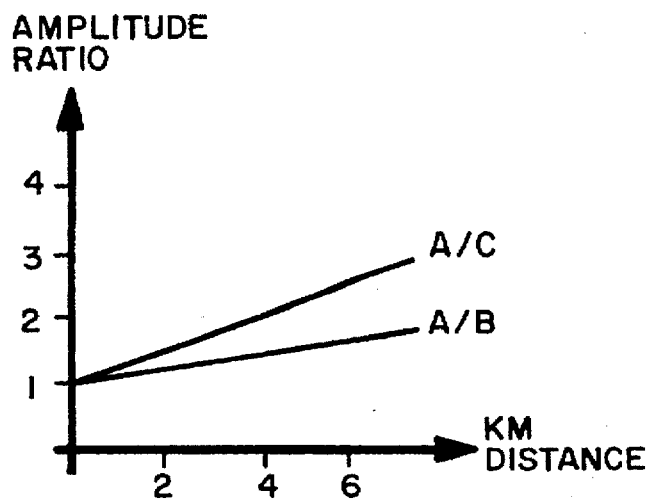
FIG. 5 shows the ratio of amplitudes of the A component versus the B component, and the A component versus the C component of the graph of FIG. 4 as a function of distance from the target.

FIGS. 3–5 demonstrate attenuation of various frequency components of target radiation as a function of distance from the target. By way of example, FIG. 3 shows a stylized representation of the radiation wherein the spectrum of the radiation has both a continuous portion and a set of spectral lines. This is the spectrum which would be measured at the location of the target, namely, at zero range. In the continuous portion of the spectrum, three components are identified by the legends A, B, and C by way of example. The frequency of component B is greater than the frequency of component A, and the frequency of component C is greater than the frequency of component B. In FIG. 4, the spectrum has been simplified to show only the continuous portion with the components A, B, and C. FIG. 4 depicts relative attenuation of the components A, B, and C at a distance from the target of five kilometers, by way of example.

Upon comparing the graphs of FIGS. 3 and 4, it is noted that in FIG. 3, the amplitudes of the components A, B, and C are equal. In FIG. 4, component B is substantially smaller than component A, and component C is substantially smaller than component B due to atmospheric absorption. Thus, upon comparing the amplitudes of the various components, such as the ratio of A to B, and the ratio of A to C, by way of example, it is observed that these ratios, which are unity in FIG. 3, differ markedly in FIG. 4.

Due to the selective attenuation of the radiation by the atmosphere as a function of frequency, the intensity ratio changes with increasing distance from the target. This is portrayed in FIG. 5 wherein the lines represent the amplitude ratios A/C and A/B. The attenuation of the radiation by the atmosphere is described by the slopes of the graph of FIG. 5, the slopes being determined by the atmospheric attenuation factors. Information from the memory 84 (FIG. 2) is employed by the computer 94 (FIG. 2) to compute the attenuation factors. The attenuation factors are based on experimental evidence as is stored in the memory 84 wherein spectra are stored for measurements conducted at various distances from each of a plurality of radiation sources. The computer 94 then computes the amplitude ratios of the selected frequency components of the measured continuous spectrum from the memory 86, and employs the amplitude ratios of the frequency components to compute the target range.

Calculation of the target range can be accomplished by (1) establishing an initial value of the amplitude ratios of the essential spectral components at zero range as is depicted in the left side of FIG. 5, (2) establishing the ratio of the spectral components at a nonzero distance such as at five kilometers presented in FIG. 5, (3) establishing the slope of a specific graph of FIG. 5 from prior knowledge of atmospheric attenuation, and (4) solvine mathematically the graphically portrayed relationship of FIG. 5 for the propagation distance along the horizontal axis of FIG. 5.

Figure 6:
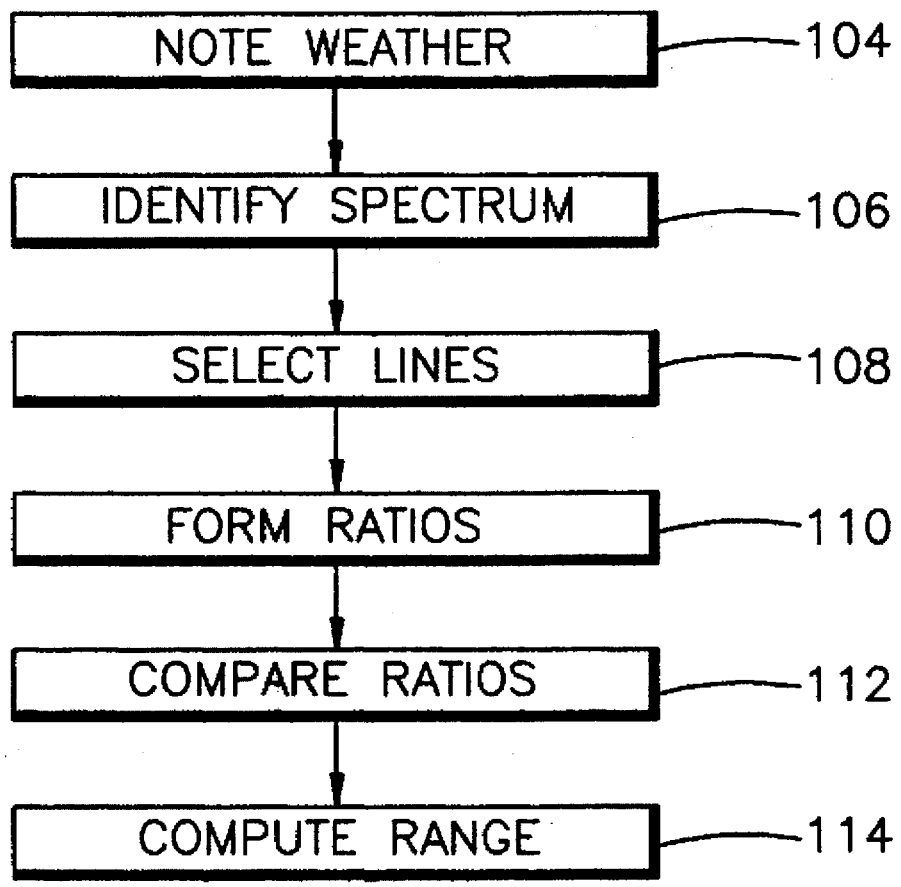
FIG. 6 is a diagram of method steps in obtaining target range from spectral data.

FIG. 6 outlines the essential steps of the foregoing procedure wherein, in block 104 the weather or other atmospheric condition is noted, and at block 106 the spectrum of a suitable target is identified. The weather conditions of block 104 is stored in the atmospheric data storage 100 (FIG. 2), and the identification of a suitable target spectrum is obtained during the acquisition and track modes of FIG. 1, by operation of the correlation unit 58. At block 108, a selection is made of spectral lines to be used in forming the ratios, the selection being made by the computer 94 (FIG. 2) which uses, by way of example, the strongest spectral lines, such as the three strongest spectral lines in the continuous spectrum of FIG. 3. Then, at block 110, the amplitude ratios of the spectral lines are formed for the measured spectrum stored in the memory 86 (FIG. 2). The ratios are compared at block 112, the comparing being done in the computer 94. This is followed by a computation of the range at block 114. The computation of the range is accomplished by the computer 94 following the procedure outlined above with reference to the graphs of FIG. 5. Thereby, the invention has accomplished the attainment of target range by a passive observation of radiation emitted by the target. It is noted that the foregoing measurement of rang can be accomplished by use of a value of intensity ratio obtained from the spectral components A and B or from the spectral components A and C. Alternatively, in the practice of the invention, plural intensity ratios can be employed for improved accuracy of measurement. For example, in the operation of the computer 94, a first measurement of the range can be accomplished by use of the spectral components A and B, and a second measurement of the range can be accomplished by the use of the spectral components A and C. The two measurements are then averaged by the computer 94 to provide an average value of the range measurement for improved accuracy in the determination of the range. As has been noted above, the graphs of FIGS. 3–4 depict the three spectral lines, A, B, and C, by way of example, and that additional lines such as lines D and E (not shown) may be employed for determination of still further intensity ratios for yet additional measurement of range. Any pairs of frequencies, such as the ratio of B and C, or the ratio of C and D, and the ratio of A and D, may be employed, assuming that the ratios are statistically independent. Thus, three spectral lines provide two statistically independent ratios, and four spectral lines provide three statistically independent ratios, by way of example. In this manner, the use of plural ratios from both the received and the reference spectra may be employed for improved accuracy in the determination of the range.

In the foregoing analysis, it has been assumed that the spectral components of the continuous spectrum have equal amplitude. In the event that these spectral components differ in amplitude, such amplitude difference appears in the reference spectrum provided by the memory 84 to the computer 94. In such case, the computer 94 introduces an additional multiplicative factor to each of the amplitude ratios of the selected frequency components to compensate for the differences of amplitude in the spectral components at zero range.

Figure 7:
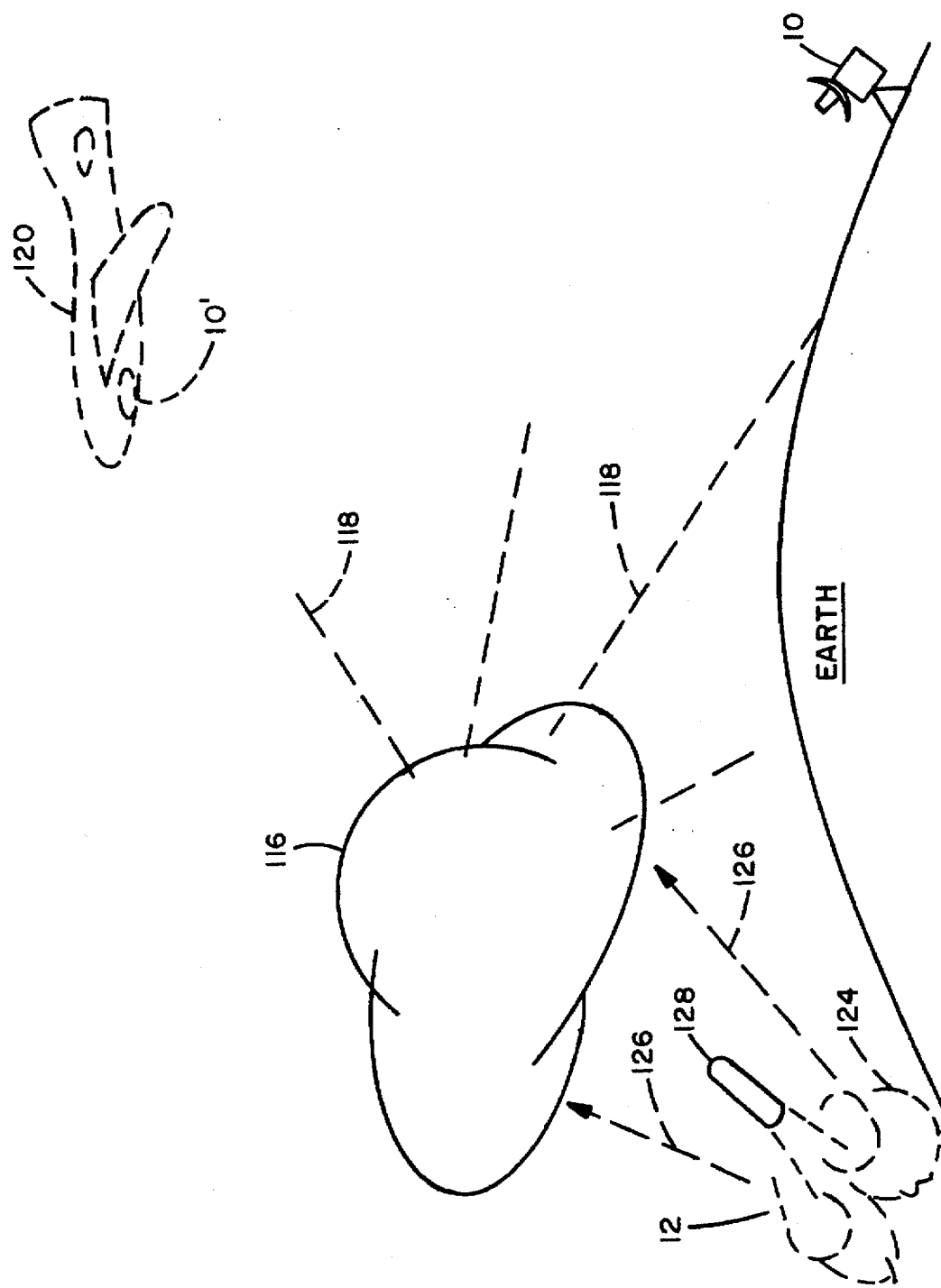
FIG. 7 shows, diagrammatically, a viewing of target radiation reflected from a cloud by the electrooptic system of the invention, wherein the system may be carried by a vehicle on the ground or an airborne vehicle.

With reference to FIG. 7, the system 10 may view radiation from the target 12 in a situation, wherein the target 12 is located beyond the earth's horizon, by observation of radiant energy emitted by the target 12 and reflected from a cloud 116 via rays 118 of radiation. Typically, the system 10 is located on the earth's surface, as indicated in solid lines, or is provided as an airborne system 10' carried by an aircraft 120, as indicated in phantom view. FIG. 7 shows the situation wherein the target 12 is a rocket 122 emitting a plume 124 which is a source of radiation 126 reflected via the rays 118 from the cloud 116 to be viewed by the system 10, or the system 10'.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A system for passive determination of the range of a source of known spectral emission, comprising:

optical apparatus for receiving radiation propagating from the source via an atmospheric propagation path to the optical apparatus, the atmosphere providing for selective attenuation of spectral lines of the radiation as a function of frequency of the spectral lines;

computer means, and means operatively coupled to said computer means for storing a known spectrum of the radiation as emitted by the source, at least a portion of said known spectrum being continuous with substantially constant amplitude and having at least a first frequency component and a second frequency component;

means operatively coupled to said computer means for analyzing a received spectrum of the radiation as received by said optical apparatus, said received spectrum having at least a first frequency component and a second frequency component;

wherein said first and said second frequency components of said received spectrum are alterable from said first and said second frequency components of said known spectrum by Doppler frequency shift due to motion of said source;

said system further comprises means for providing said computer means with spectrally dependent attenuation characteristics of the atmosphere;

said computer means computes plural amplitude ratios of frequency components wherein one of said amplitude ratios is the ratio of amplitudes of the first and the second frequency components of said known spectrum and a second of said amplitude ratios is the ratio of amplitudes of the first and the second frequency components of said received spectrum;

said continuous substantially constant spectral portion enables said ratios to be independent of Doppler frequency shift; and said computer means is operative further to determine the range of the source based on said amplitude ratios and on said attenuation characteristics of the atmosphere.

2. A system according to claim 1 further comprising means coupled to said computer means for computing range rate of said source from a succession of range measurements of the source.

3. A system according to claim 1 wherein said computer means is operative to correlate the received spectrum with the known spectrum for identification of the source.

4. A system according to claim 1 wherein said optical apparatus includes a signature memory and means for correlating the received spectrum with a reference spectrum of said signature memory to determine the presence of the source.

5. A system according to claim 1 wherein said source undergoes motion relative to said optical apparatus, and said optical apparatus includes means for tracking the source.

6. A system according to claim 1 wherein the determination of the range of the source constitutes a first range measurement;

said known spectrum includes a third frequency component and said received spectrum includes a third frequency component; and said computer means is operative to provide an additional measurement of the range of the source based on the third frequency component of said known spectrum and the third frequency component of said received spectrum, said computer means being operative further to provide an average value of the first range measurement and the additional range measurement.

7. A method for passive determination of the range of a source of known spectral emission by use of optical apparatus for viewing the source, comprising the steps of:

receiving radiation propagating from the source via an atmospheric path to the optical apparatus, the atmosphere providing for selective attenuation of frequency components of the radiation as a function of frequency of the frequency components;

storing a known spectrum of the radiation as emitted by the source, at least a portion of said known spectrum being continuous with substantially constant amplitude and having act least a first frequency component and a second frequency component;

analyzing a received spectrum of the radiation as received by the optical apparatus, the received spectrum having at least a first frequency component and a second frequency component;

wherein said first and said second frequency components of said received spectrum are alterable from said first and said second frequency components of said known spectrum by Doppler frequency shift due to motion of said source;

said method further comprising steps of obtaining spectrally dependent attenuation characteristics of the atmosphere;

computing plural amplitude ratios of the frequency components wherein one of said amplitude ratios is the ratio of amplitudes of the first and the second frequency components of said known spectrum and a second of said amplitude ratios is the ratio of amplitudes of the first and the second frequency components of said received spectrum; and determining the range of the source based on said amplitude ratios and on said attenuation characteristics of the atmosphere;

wherein said continuous substantially constant spectral portion enables said ratios to be independent of Doppler frequency shift.

8. A method according to claim 7 wherein said known spectrum includes a third frequency component and said received spectrum includes a third frequency component, said method including further steps of determining range based on computation of additional amplitude ratios having said third frequency components to produce the range of the source; and averaging the range of the source provided in both of said range-determining steps.

* * * * *